(12) United States Patent
Dardailler et al.

(10) Patent No.: US 11,175,801 B2
(45) Date of Patent: *Nov. 16, 2021

(54) INTERACTOR FOR A GRAPHICAL OBJECT

(71) Applicant: International Business Machines Corporation, Armonk, NY (US)

(72) Inventors: Pascale Dardailler, Grasse (FR); Marc Durocher, La Colle sur Loup (FR); Damien A. F. Garbarino, Vallauris (FR); Phillippe Kaplan, Le Rouret (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/030,938

(22) Filed: Jul. 10, 2018

(65) Prior Publication Data

US 2018/0314402 A1 Nov. 1, 2018

Related U.S. Application Data

(63) Continuation of application No. 14/187,398, filed on Feb. 24, 2014, now Pat. No. 10,114,528.

(30) Foreign Application Priority Data

Mar. 6, 2013 (GB) ..................... 1303953

(51) Int. Cl.
  *G06F 3/0484* (2013.01)
  *G06F 3/0482* (2013.01)
  *G06Q 10/10* (2012.01)

(52) U.S. Cl.
  CPC .......... *G06F 3/0484* (2013.01); *G06F 3/0482* (2013.01); *G06F 3/04847* (2013.01); *G06Q 10/109* (2013.01)

(58) Field of Classification Search
  CPC .... G06F 17/246; G06F 3/0484; G06F 3/0482; G06F 3/04847; G06Q 10/109
  See application file for complete search history.

(56) References Cited

U.S. PATENT DOCUMENTS 6,331,863 B1 12/2001 Meier et al.
6,972,776 B2 12/2005 Davis et al.
(Continued)

FOREIGN PATENT DOCUMENTS

WO 2006030055 A1 3/2006
WO 2011041885 A1 4/2011

OTHER PUBLICATIONS

Seah, "How to Change the Compact Calendar—YouTube", 2012 <https://www.youtube.com/watch?v=Lx5lgfNQzkg> (Year: 2012).*

(Continued)

*Primary Examiner* — Beau D Spratt
(74) *Attorney, Agent, or Firm* — Law Office of Jim Boice

(57) ABSTRACT

A method, system and/or computer program product changes the properties of a graphical object. One or more processors receive a graphical display data set including information for generating a graphical display of a spreadsheet, where the spreadsheet comprises a cell having a perimeter that is defined by a plurality of edges. In the cell, a property adjusted by selecting a constrained edge of the cell is identified. A graphical control for the identified property is created and displayed in response to a user selecting the constrained edge and requesting the graphical control from a context menu associated with the cell, where activating the graphical control increases a size of the cell beyond the boundary conditions of the spreadsheet. A user input selecting the graphical control is received. In response, (Continued)

the cell is expanded beyond the boundary conditions of the spreadsheet and the property is displayed on the graphical user interface.

20 Claims, 10 Drawing Sheets

(56) References Cited

U.S. PATENT DOCUMENTS

| | | | | |
|---|---|---|---|---|
| 6,988,241 | B1* | 1/2006 | Guttman | G06F 40/18 |
| | | | | 715/220 |
| 7,526,286 | B1 | 4/2009 | Allen et al. | |
| 8,996,150 | B1* | 3/2015 | Ambrose | G06Q 30/0621 |
| | | | | 700/97 |
| 2002/0112180 | A1 | 8/2002 | Land et al. | |
| 2003/0107604 | A1* | 6/2003 | Ording | G06F 3/0481 |
| | | | | 715/788 |
| 2004/0010513 | A1 | 1/2004 | Scherr et al. | |
| 2004/0021676 | A1 | 2/2004 | Chen et al. | |
| 2004/0090470 | A1 | 5/2004 | Kim et al. | |
| 2005/0015379 | A1* | 1/2005 | Aureglia | G06F 17/246 |
| 2005/0039142 | A1 | 2/2005 | Jalon et al. | |
| 2005/0091596 | A1 | 4/2005 | Anthony et al. | |
| 2006/0015804 | A1* | 1/2006 | Barton | G06F 40/18 |
| | | | | 715/213 |
| 2006/0265660 | A1* | 11/2006 | Hullot | G06Q 10/109 |
| | | | | 715/733 |
| 2007/0168892 | A1 | 7/2007 | Brush et al. | |
| 2008/0229024 | A1 | 9/2008 | Plamondon | |
| 2009/0002324 | A1 | 1/2009 | Harbeson et al. | |
| 2011/0113363 | A1 | 5/2011 | Hunt et al. | |
| 2011/0167382 | A1 | 7/2011 | Van Os | |
| 2012/0147033 | A1 | 6/2012 | Singhal | |
| 2012/0236201 | A1 | 9/2012 | Larsen et al. | |
| 2012/0249435 | A1 | 10/2012 | Nahm | |
| 2012/0260152 | A1* | 10/2012 | Shimizu | G06F 3/04883 |
| | | | | 715/217 |
| 2013/0036369 | A1 | 2/2013 | Mitchell et al. | |
| 2013/0086121 | A1 | 4/2013 | Preslan | |
| 2013/0136412 | A1* | 5/2013 | Lee | H04M 3/4878 |
| | | | | 386/230 |
| 2013/0239049 | A1 | 9/2013 | Perrodin et al. | |
| 2013/0293469 | A1 | 11/2013 | Hakoda et al. | |
| 2014/0059487 | A1 | 2/2014 | Baumann et al. | |
| 2014/0237020 | A1 | 8/2014 | Schachtel et al. | |
| 2014/0282166 | A1 | 9/2014 | Temkin et al. | |
| 2015/0178690 | A1 | 6/2015 | May et al. | |

OTHER PUBLICATIONS

Apache OpenOffice Wiki "Resizing, positioning, and inserting rows and columns" <http://web.archive.org/web/20121203055053/https://wiki.openoffice.org/wiki/Documentation/OOo3_User_Guides/Writer_Guide/Resizing_positioning_rows_columns> (Year: 2012).*
UK Intellectual Property Office, Search Report for GB Application No. 1303953.2, dated Sep. 6, 2013.
List of IBM Patents or Patent Application Treated as Related. Jul. 9, 2018.
Daypilot, "How To Set up Overnight Shift Scheduling With Daypilot Calendar", daypilot.org, Apr. 13, 2011. https://kb.daypilot.org/55182/how-to-set-up-overnight-shift-scheduling/.
Cogen, David. "How To Customize Your Home Screen On the Nexus 7", laptopmag.com, Sep. 18, 2012. https://www.laptopmag.com/articles/how-to-customize-your-home-screen-on-the-nexus-7.
Bhutani, Dhruv. "Windows 8 Review", fonearena.com, Nov. 5, 2012. https://www.fonearena.com/blog/57061/windows-phone-8-review.html.
Rehman, A. "Holo Launcher Brings the ICS Home Screen To Older (2.2 & Higher) Android Devices", addictivetips.com, Jun. 5, 2012. https://www.addictivetips.com/android/holo-launcher-brings-the-ics-home-screen-to-android-2-2-higher/.
U.S. Appl. No. 14/187,398 Non-Final Office Action dated Oct. 23, 2015.
U.S. Appl. No. 14/187,398 Final Office Action dated May 19, 2016.
U.S. Appl. No. 14/187,398 Non-Final Office Action dated Apr. 21, 2017.
U.S. Appl. No. 14/187,398 Final Office Action dated Nov. 15, 2017.

* cited by examiner

Interactor Tool 200

Edge property detector 202

Interactor Method 300

Interactor Widget 400

FIG. 2

Cannot resize event object after 8pm mouse cursor hovers over sensitive area to adjust event property Event now lasts into next day Validate the change

| 2012 | Mon | Tue | Wed | Thu | Fri | Sat | Sun |
|------|-----|-----|-----|-----|-----|-----|-----|
| 9am  |     |     |     |     |     |     |     |
| 10am |     |     |     |     |     |     |     |
| 11am |     |     |     |     |     |     |     |
| 12am |     |     |     |     |     |     |     |
| 1pm  |     |     |     |     |     |     |     |
| 2pm  |     |     |     |     |     |     |     |
| 3pm  |     |     |     |     |     |     |     |
| 4pm  |     |     |     |     |     |     |     |
| 5pm  |     |     |     |     |     |     |     |
| 6pm  |     |     |     |     |     |     |     |
| 7pm  |     |     |     |     |     |     |     |
| 8pm  |     |     |     |     |     |     |     |

10am Sat

11am Sun

FIG. 5F

INTERACTOR FOR A GRAPHICAL OBJECT

This application is based on and claims the benefit of priority from United Kingdom (GB) Patent Application 1303953.2, filed on Mar. 6, 2013, and herein incorporated by reference in its entirety.

BACKGROUND

This invention relates to a method and apparatus for an interactor for a graphical object. In particular the invention relates to a method and apparatus for editing a property associated with a hidden edge of a graphical object in graphical user interface.

The application domain is usability and interactive resizing of a graphical object when, for instance, the graphical object is not entirely visible on a graphical user interface.

Known prior art discloses a method for viewing larger than screen size digital content.

Other known prior art discloses a method to automatically resize a window in a graphical user interface.

Other known prior art discloses a method for handling and scrolling of content on screen.

Other known prior art discloses a method for scrolling content using a screen pointing device.

Other known prior art discloses a method for scrolling a view.

The above solutions generally allow expansion of a graphical object within the limits of a graphical user interface but are otherwise constrained. Such constraints can lead to frustration when the object is very large and loss of context when resizing.

SUMMARY

A method, system, and/or computer program product change a graphical object property in a graphical user interface. A graphical display data set is received including information for generating a graphical display of a spreadsheet, where the spreadsheet comprises a cell having a perimeter that is defined by a plurality of edges. In the cell, a property that is adjusted by selecting a constrained edge from the plurality of edges of the cell is identified, where movement of the constrained edge is constrained by boundary conditions of the spreadsheet. On the graphical display a graphical control for the identified property is created and displayed, where the graphical control is created in response to a user selecting the constrained edge and requesting the graphical control from a context menu associated with the cell, and where activating the graphical control increases a size of the cell beyond the boundary conditions of the spreadsheet. A user input selecting the graphical control is received. In response to receiving the user input selecting the graphical control, the cell is expanded beyond the boundary conditions of the spreadsheet and the property that is adjusted in a separate field from the graphical control is displayed on the graphical user interface.

BRIEF DESCRIPTION OF THE DRAWINGS

FIG. 2 is a component diagram of the preferred embodiment;

FIG. 5a to FIG. 5f depict example screens showing the initial and final states of a graphical user interface and the preferred embodiment.

DETAILED DESCRIPTION

Figure 1:
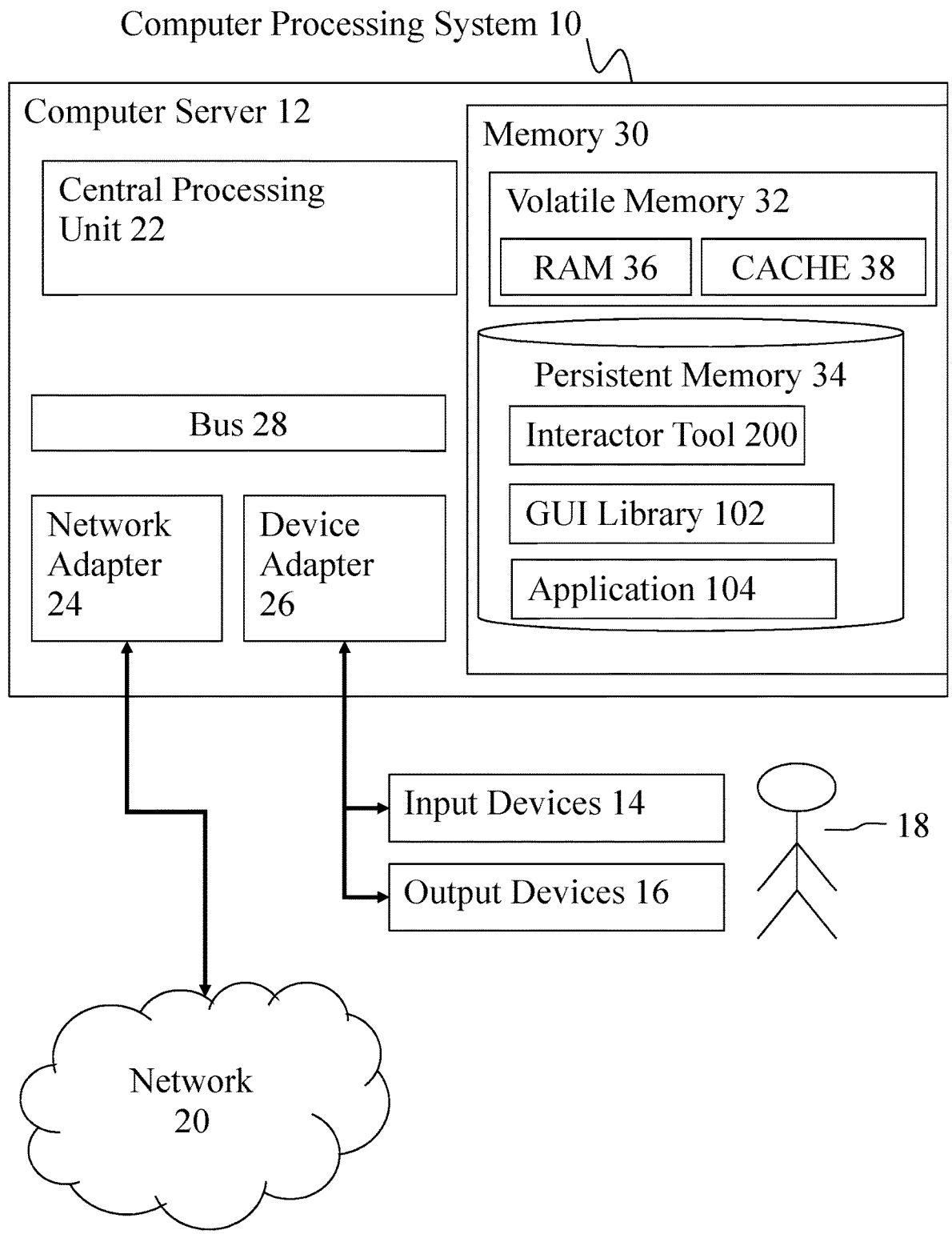
FIG. 1 is a deployment diagram of the preferred embodiment.

Referring to FIG. 1, the deployment of a preferred embodiment in computer processing system 10 is described. Computer processing system 10 is operational with numerous other general purpose or special purpose computing system environments or configurations. Examples of well-known computing processing systems, environments, and/or configurations that may be suitable for use with computer processing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer processing system 10 may be described in the general context of computer system-executable instructions, such as program modules, being executed by a computer processor. Generally, program modules may include routines, programs, objects, components, logic, and data structures that perform particular tasks or implement particular abstract data types. Computer processing system 10 may be embodied in distributed cloud computing environments where tasks are performed by remote processing devices that are linked through a communications network. In a distributed cloud computing environment, program modules may be located in both local and remote computer system storage media including memory storage devices.

Computer processing system 10 comprises: general-purpose computer server 12 and one or more input devices 14 and output devices 16 directly attached to the computer server 12. Computer processing system 10 is connected to a network 20. Computer processing system 10 communicates with a user 18 using input devices 14 and output devices 16. Input devices 14 include one or more of: a keyboard, a scanner, a mouse, trackball or another pointing device. Output devices 16 include one or more of a display or a printer. Computer processing system 10 communicates with network devices (not shown) over network 20. Network 20 can be a local area network (LAN), a wide area network (WAN), or the Internet.

Computer server 12 comprises: central processing unit (CPU) 22; network adapter 24; device adapter 26; bus 28 and memory 30.

CPU 22 loads machine instructions from memory 30 and performs machine operations in response to the instructions. Such machine operations include: increment or decrement a value in register (not shown); transfer a value from memory 30 to a register or vice versa; take instructions from a different location in memory if a condition is true or false (also known as a conditional branch instruction); and add or subtract the values in two different registers and put the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for enabling communication between the computer server 12 and network devices.

Device adapter 26 is connected to bus 28 and input devices 14 and output devices 16 for enabling communication between computer server 12 and input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Generally volatile memory is used because it is faster and generally non-volatile memory is used because it will hold the data for longer. Computer processing system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

The set of program modules configured to carry out the functions of the preferred embodiment comprises: interactor tool 200; GUI library 102; and application 104. Further program modules that support the preferred embodiment but are not shown including firmware, boot strap program, operating system, and support applications. Each of the operating system, support applications, other program modules, and program data or some combination thereof, may include an implementation of a networking environment.

Computer processing system 10 communicates with at least one network 20 (such as a local area network (LAN), a general wide area network (WAN), and/or a public network like the Internet) via network adapter 24. Network adapter 24 communicates with the other components of computer server 12 via bus 28. It should be understood that although not shown, other hardware and/or software components could be used in conjunction with computer processing system 10. Examples, include, but are not limited to: microcode, device drivers, redundant processing units, external disk drive arrays, redundant array of independent disks (RAID), tape drives, and data archival storage systems.

Interactor tool 200 is described in more detail below with reference to FIG. 2.

Graphical user interface (GUI) library 102 is a library of graphical user interface code that provides primary control for objects in a graphical user interface.

Application 104 is a computer program application that uses GUI library 102 in order to operate. The preferred example is a calendar application but any graphical applications could benefit from the embodiments. Another example of an application that would benefit from the embodiments is a spreadsheet application.

Referring to FIG. 2 interactor tool 200 comprises: edge property detector 202; interactor method 300; and interactor widget 400.

Edge property detector 202 is for detecting properties that are associated with edges on a selected graphical user object and in the preferred embodiment a property that is associated with a selected edge. When an edge of a graphical user object is moved then a property associated with that edge is adjusted. For example, a box that represents time boundaries in a graphical array calendar could have an edge moved to adjust the time boundaries.

Figure 3:
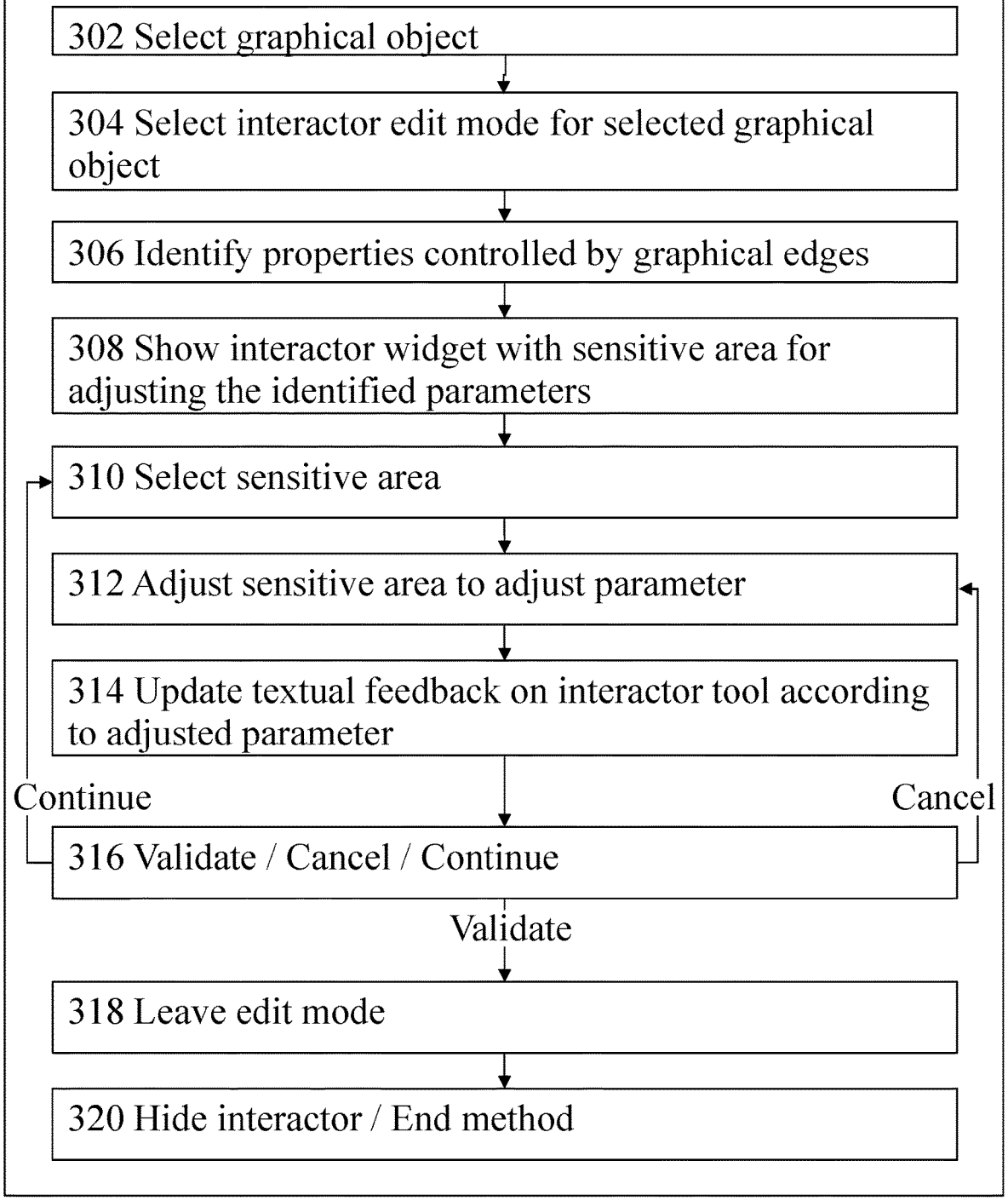
FIG. 3 is a flow diagram of a process of the preferred embodiment.

Interactor method 300 is for controlling interactor tool 200 and is described in more detail with respect to FIG. 3.

Figure 4:
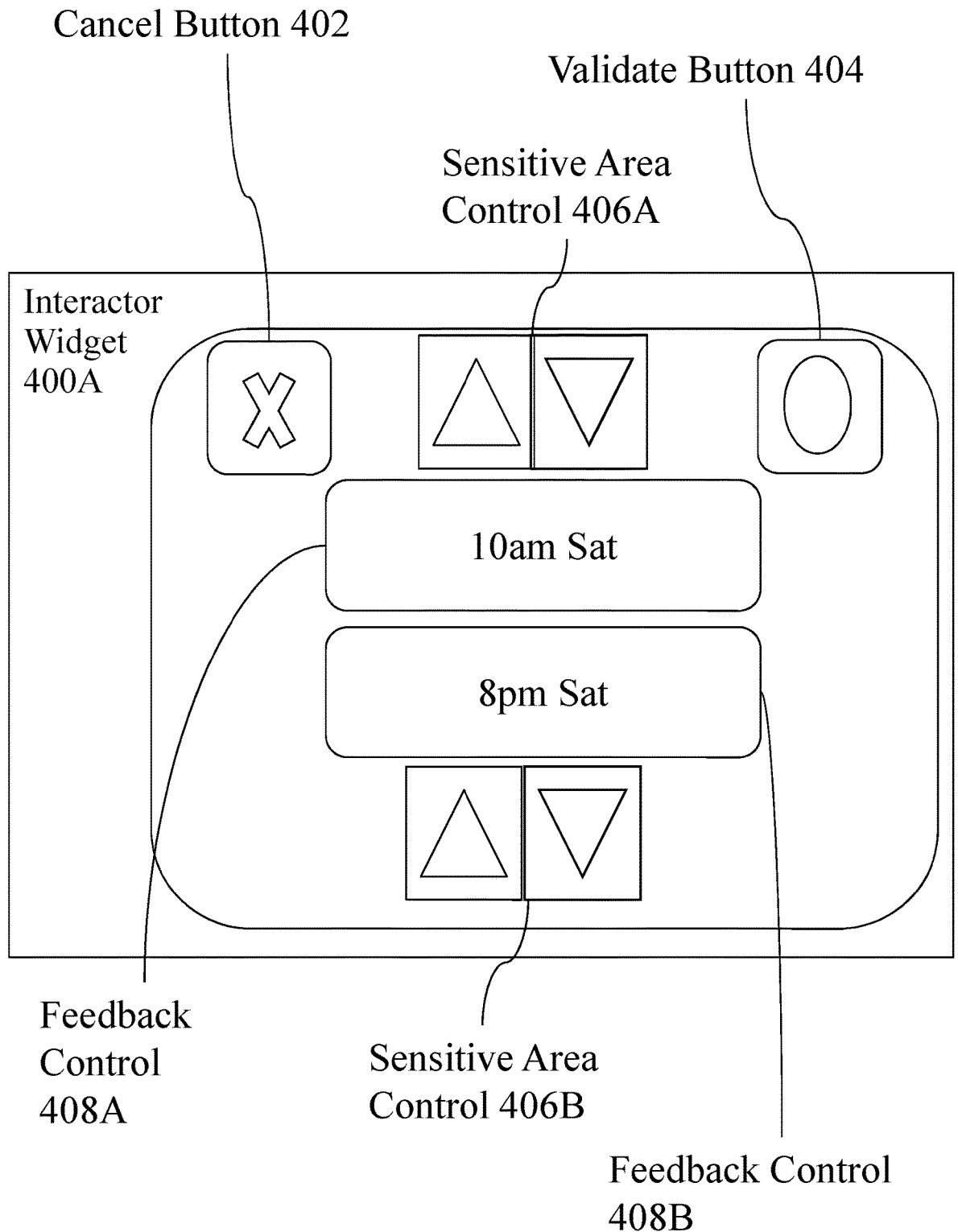
FIG. 4 is an example diagram of an interactor widget of the preferred embodiment.

Interactor widget 400 is a graphical interface that comprises additional graphical controls and feedback for a graphical object in the GUI and is described in more detail with respect to FIG. 4.

Referring to FIG. 3, interactor method 300 comprises sequential logical process steps 302 to 320.

Step 302 is for enabling selection of a graphical object on a graphical user interface. Typically this happens when a user moves a mouse cursor over a graphical object and presses the select button; this user action translates to an event generated for the mouse cursor at the position over the graphical object on the screen. The event is recorded by interactor method 300.

Step 304 is for enabling selection of an interactor edit mode for the selected graphical object. Typically this is achieved when a user selects an interactor edit mode option from a context menu associated with the graphical object. This user action translates to an event that is recorded by interactor method 300 and initiates step 306.

Step 306 is for identifying properties that are controlled by the edges of the selected graphical object. In the preferred embodiment all edges are considered and all associated properties identified. The example of FIG. 4 shows two properties but more could be identified. In other embodiments, there could be a user step of selecting edges that are considered for associated properties. Once the properties are identified then step 308.

Step 308 is for displaying interactor widget 400 comprising interactor sensitive area controls for each identified property and respective interactor text feedback controls.

Step 310 is for enabling selection of the interactor sensitive area controls. Typically the user will move the mouse cursor to the control and select it to generate control events.

Step 312 is for adjusting the associated property of the control events generated by the selection of the interactor sensitive area control.

Step 314 is for updating the feedback control based on the adjusted property.

Step 316 is for enabling a confirmation or cancel control or allowing the adjustment of interactor tool 200 to continue. Until the confirmation or cancel control are selected then the process repeats from step 310. If the user selects continue then step 318. If the user selects cancel then step 312 and the property is reset to the original value.

Step 318 is for leaving the edit mode.

Step 320 is for removing the interactor widget 400 from the graphical display and for ending interactor method 300.

Referring to FIG. 4, interactor widget 400 comprises: cancel button 402; validate button 404; interactor sensitive area control 406a and 406b; interactor feedback control 408a and 408b.

Cancel button 402 is for sending an event when selected to reset any adjustments to the properties to the original values.

Validate button 404 is for sending an event when selected to confirm any adjustments to the properties.

Interactor sensitive area control 406a (and 406b) is a control that provides increase events and decrease events when selected by a user for an associated property.

Interactor feedback controls 408a and 408b are controls that update text or graphical representation of the associated property. In the figure, the text values are time date values from a calendar object that can be increased or decreased according to user selection of a respective interactor sensitive area control.

Referring to FIG. 5a to FIG. 5f, different states of an example graphical user interface are described. The example comprises a calendar grid interface 500 with a graphical event object 502 superimposed. The calendar grid comprises days of the week along a horizontal axis and times along a vertical axis.

Figure 5A:
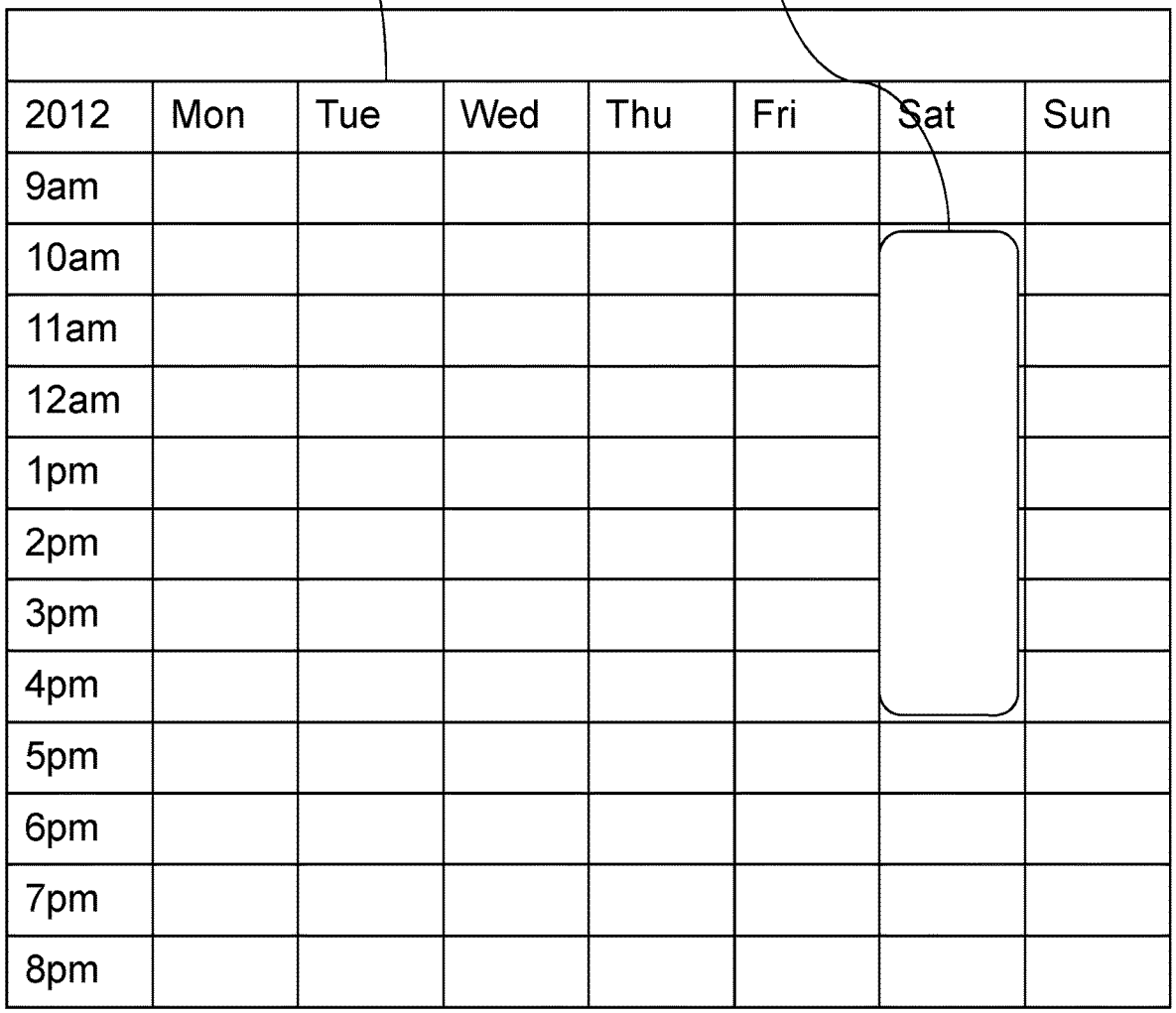

Referring to FIG. 5a, graphical event object 502 represents an appointment that extends from 10 am Saturday to 5 pm Saturday on the calendar grid.

Figure 5B:
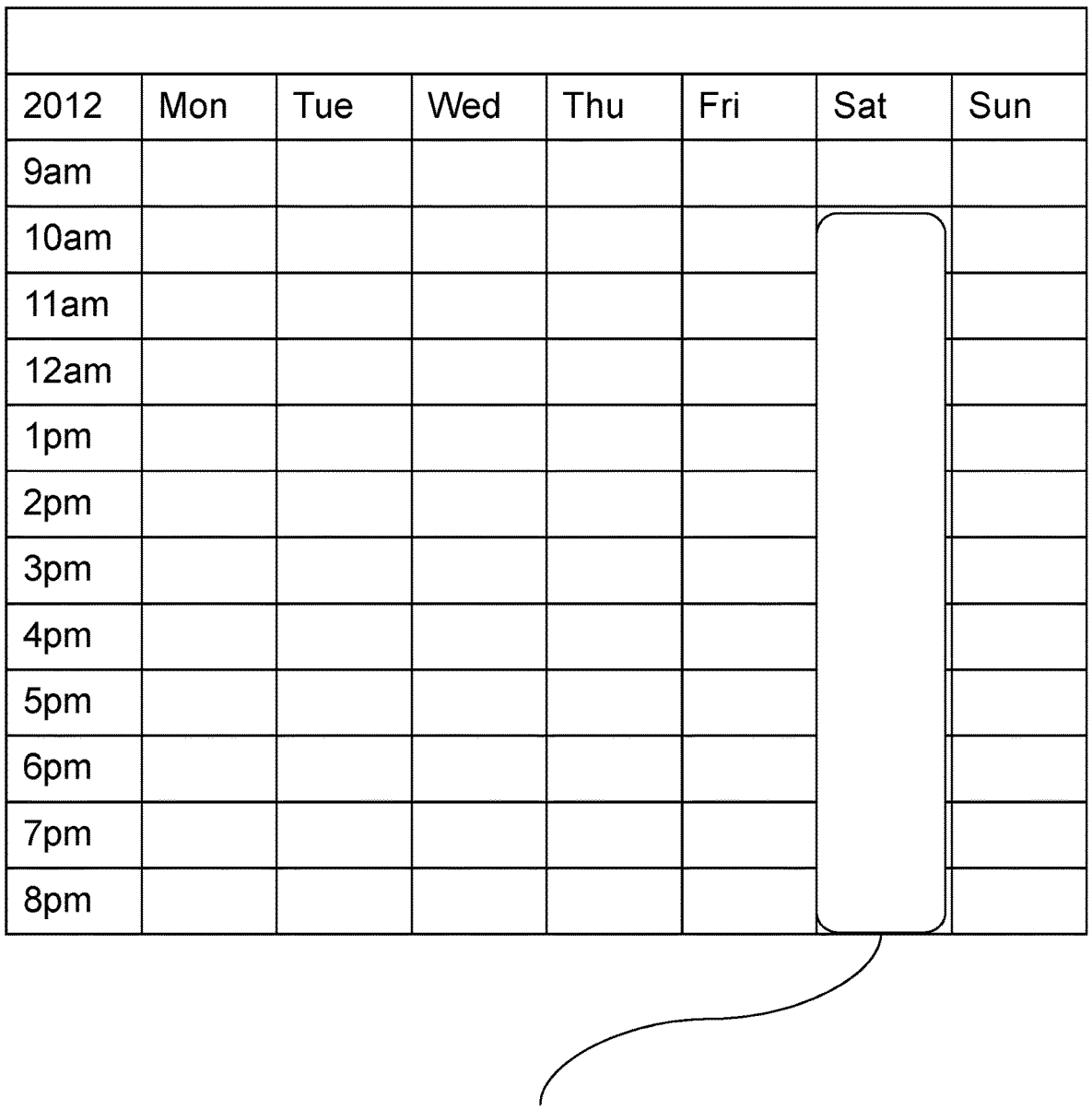

Referring to FIG. 5b, a user has dragged an edge of graphical appointment object over 8 pm but no further extension is possible due to an 8 pm boundary limitation of the calendar grid interface 500.

Figure 5C:
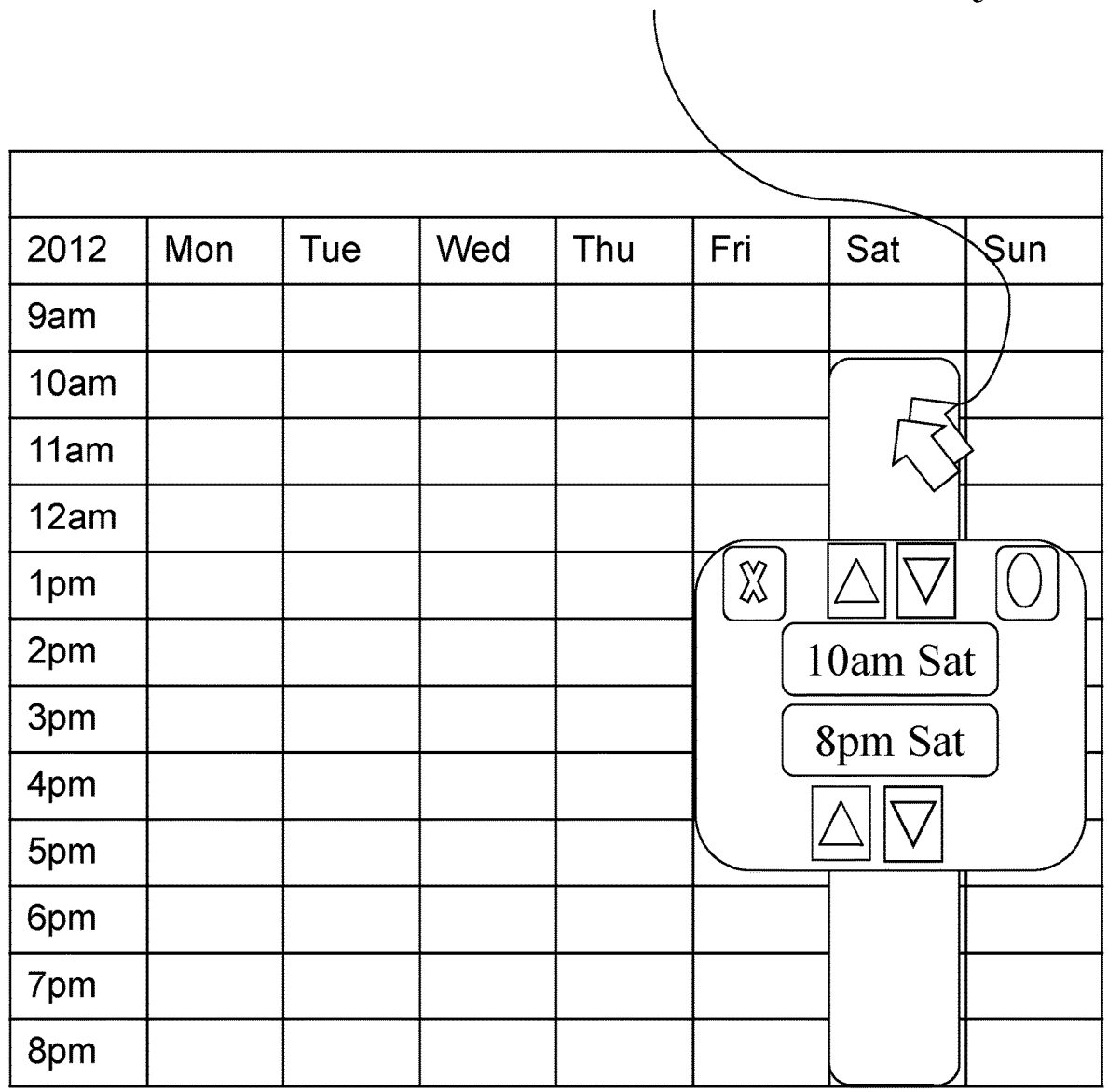

Referring to FIG. 5c, interactor edit mode has been selected with a double click on the event object and interactor widget 400 is displaced over graphical event object 502. In other embodiments there can be different methods of selecting interactor edit mode. In other embodiments, interactor widget 400 can be displayed anywhere in the graphical user interface.

Figure 5D:
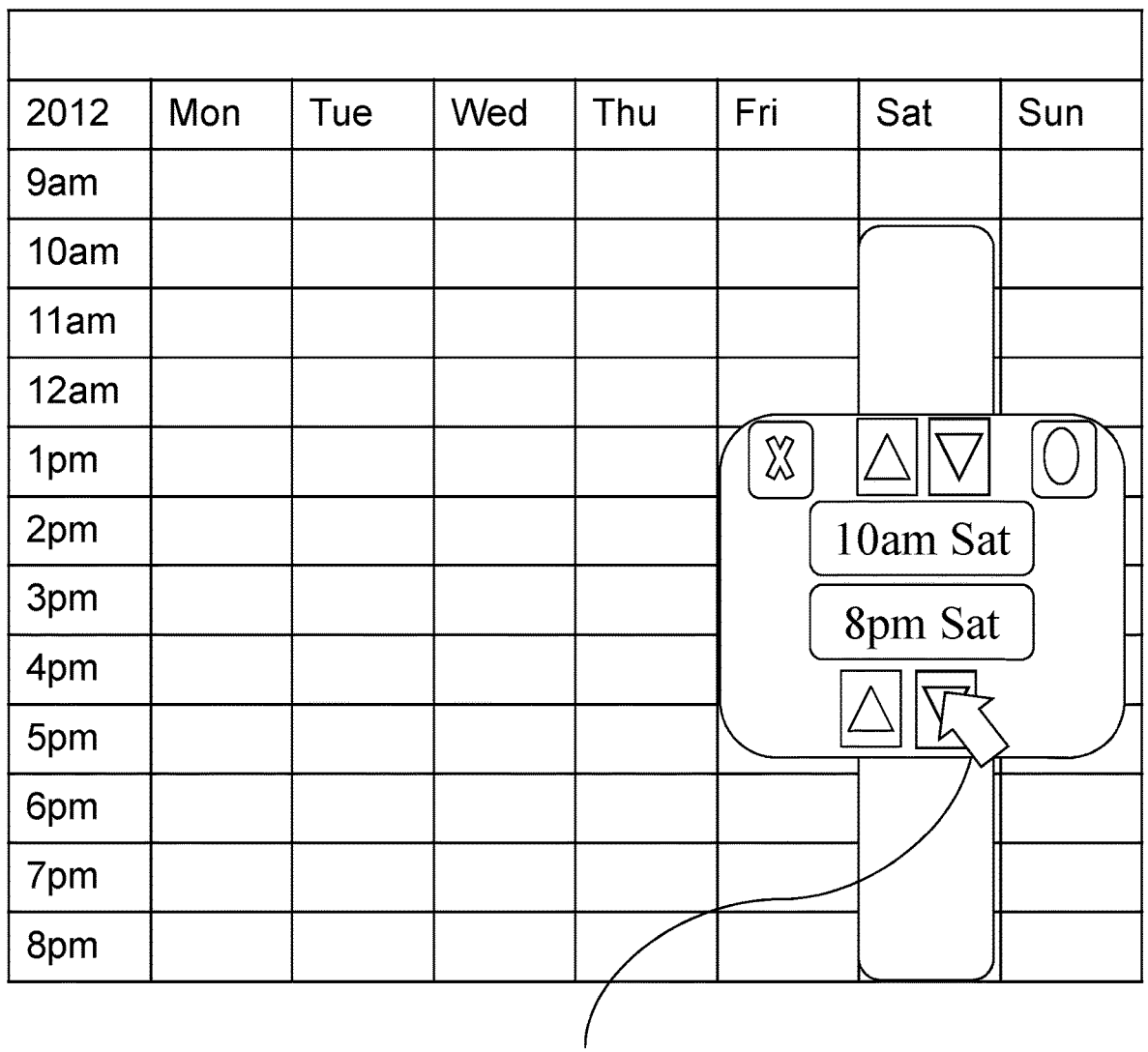

Referring to FIG. 5d, a user selects a sensitive area with the mouse cursor and adjusts the control. In other embodiments a mouse scroll wheel can be used with an appropriate control.

Figure 5E:
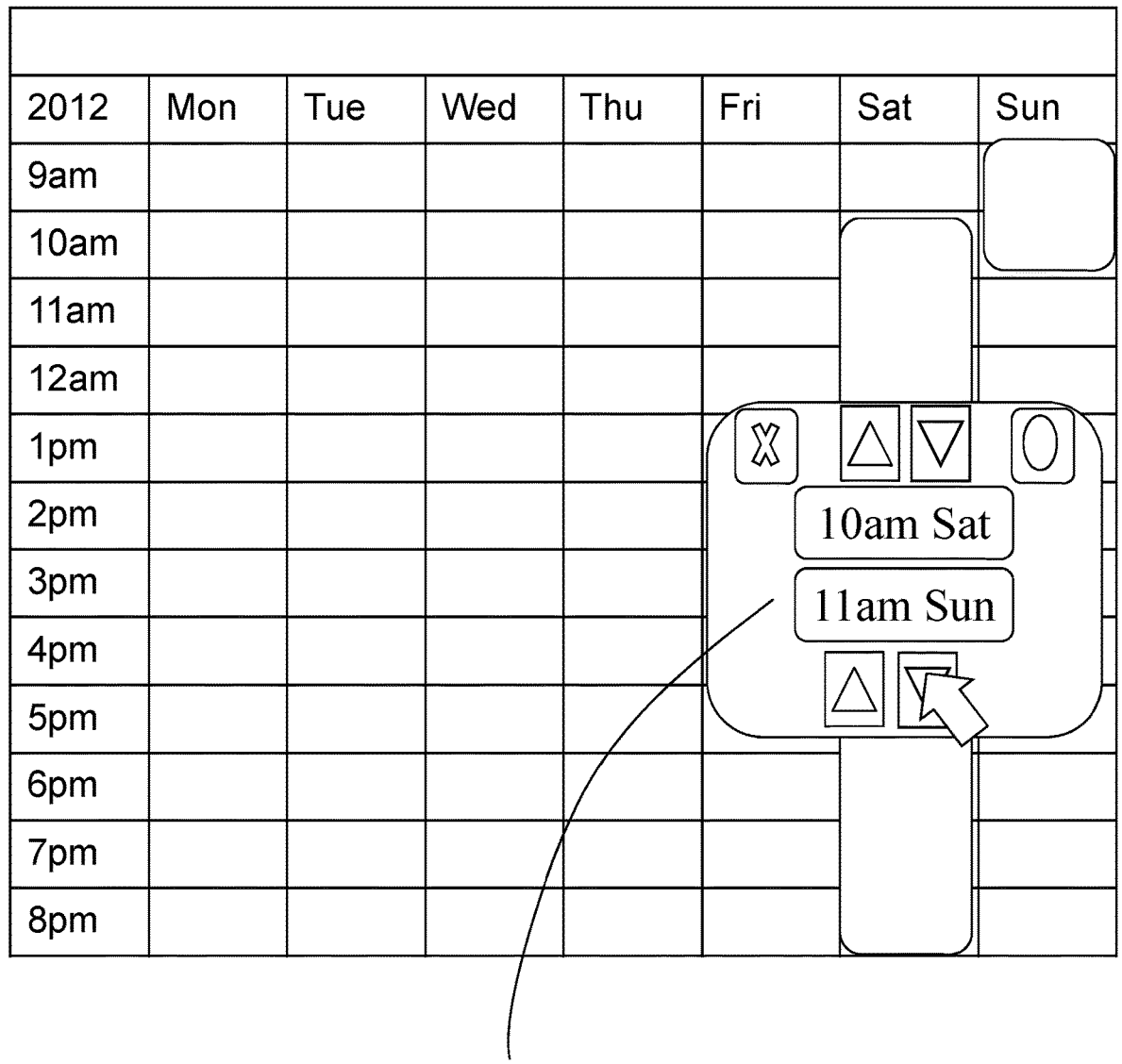

Referring to FIG. 5e, the user mouse cursor is shown over the control and the user has adjusted the control so that the event now lasts into the next day till 11 am.

Referring to FIG. 5f, the user mouse cursor is shown having selected the validate button and confirming the adjustment.

Thus, as described herein, in a first aspect of the invention there is provided a method for changing a graphical object property in a graphical user interface comprising: selecting a graphical object; identifying a property adjusted by a moveable edge of the graphical object wherein the property adjustment may be constrained by the graphical user interface; creating and displaying an additional graphical control for the identified property; and adjusting the property based on user interaction with the additional graphical control wherein the property is no longer constrained by the graphical user interface.

The method also encompasses the case when a graphical object is not so constrained by a user interface and a user wishes to use an additional graphical control.

The embodiments relate to a method for resizing a shape that is constrained or partially visible on a graphical screen. This implies providing a dedicated graphical interactor that allows control of properties associated with each edge of the shape.

Preferably the method is initiated by selecting from a context menu associated with the graphical object.

More preferably feedback for the property is displayed in association with the additional graphical control.

Still more preferably further comprising removing the additional graphical control after a user has confirmed the adjusted property value.

Most preferably the feedback for the property and the additional graphical control are displayed within an interactor widget. The interactor widget may be displayed on or near to or away from the graphical object depending on the context of the graphical object and the graphical user interface.

Advantageously, the additional graphical control is created when a user selects a constrained edge and requests an associated additional graphical control.

In the preferred embodiment, the type and number of additional graphical controls is statically linked to the type of graphical object but in other embodiments dynamic linking of graphical controls to edges and properties is envisaged.

More advantageously further comprising creating additional graphical controls and associating them respectively with a constrained edge and an edge opposite to the constrained edge.

Still more advantageously further comprising creating additional graphical controls for every edge of the graphical object.

Most advantageously further comprising resetting the properties if a user cancels the additional graphical control. A control can be provided for cancelling the additional graphical control or the additional graphical control is cancelled if the user control is focused on anything other than the additional control.

The embodiments have an effect on an application and graphical user interface that is external to processes carried on within the application or graphical user interface. The embodiments have an effect that operates at the machine level of the computer and not at the application level, the embodiments are independent of any application that is executing simultaneously. The embodiments have an effect that results in the computer being made to operate in a new way whereby a new interface is provided.

In a second aspect of the invention there is provided an interactor tool for changing a property of a graphical object in a graphical user interface comprising: an edge property detector for identifying a property controlled by a moveable edge of a selected graphical object wherein the property adjustment may be constrained if the movement of the edge is constrained by boundary conditions; and an additional graphical control that is created and displayed for the identified property and allows adjustment of the property based on user interaction of the additional graphical control wherein the property is no longer constrained by the boundary conditions and graphical object edge.

In a third aspect of the invention there is provided a computer program product for changing a property of a graphical object in a graphical user interface, the computer program product comprising a computer-readable storage medium having computer-readable program code embodied therewith and the computer-readable program code configured to perform all the steps of the methods.

The computer program product comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In a fourth aspect of the invention there is provided a computer program stored on a computer readable medium and loadable into the internal memory of a digital computer, comprising software code portions, when said program is run on a computer, for performing all the steps of the method claims.

In a fifth aspect of the invention there is provided a data carrier aspect of the preferred embodiment that comprises functional computer data structures to, when loaded into a computer system and operated upon thereby, enable said computer system to perform all the steps of the method claims. A suitable data-carrier could be a solid-state memory, magnetic drive or optical disk. Channels for the transmission of data may likewise comprise storage media of all descriptions as well as signal-carrying media, such as wired or wireless signal-carrying media.

Further embodiments of the invention are now described. It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

It will be clear to one skilled in the art that many improvements and modifications can be made to the foregoing exemplary embodiment without departing from the scope of the present invention.

What is claimed is:

1. A method comprising:
partially obscuring, by one or more processors, a cell in a spreadsheet on a graphical user interface with a pop-up window to create a partially obscured cell;
identifying, by one or more processors, all properties that are associated with the cell;
receiving, by one or more processors, a selection of the partially obscured cell;
identifying, by one or more processors, a property adjusted by a moveable edge of the partially obscured cell, wherein a property adjustment of the property adjusted is initially constrained by the graphical user interface, and wherein the property is from said all properties that are associated with the cell;
creating and displaying, by one or more processors, an additional graphical control for the identified property, wherein the additional graphical control is created in response to a user selecting a constrained edge and requesting the additional graphical control from a context menu associated with the partially obscured cell, wherein the additional graphical control includes a control icon that increases a size of the partially obscured cell beyond a viewable area of the graphical user interface, wherein the additional graphical control is incorporated into the pop-up window, and wherein the pop-up window includes a visual representation of a button that, when activated, expands the partially obscured cell in a direction in which the partially obscured cell is to extend beyond its visibly displayed portion;
adjusting, by one or more processors, the identified property based on a user interaction with the additional graphical control, wherein the identified property is no longer constrained by the graphical user interface; and
displaying, by one or more processors, feedback for the identified property being adjusted with the additional graphical control, wherein the additional graphical control causes the identified property of the partially obscured cell to be adjusted, and wherein the adjusted property is displayed in a separate field from the additional graphical control on the graphical user interface.

2. The method of claim 1, further comprising:
resetting, by one or more processors, the identified property in response to a user cancelling the additional graphical control.

3. The method of claim 1, further comprising:
modifying, by one or more processors, other cells that surround the partially obscured cell with the identified property of the partially obscured cell.

4. The method of claim 1, wherein operations shown in claim 1 are performed at a machine level of a computer that is independent of an application that generated the graphical user interface.

5. The method of claim 1, wherein:
   a user input area includes information indicative of how the constrained edge can be moved by a user input received through a keyboard input device; and
   the user input is received through the keyboard input device.

6. The method of claim 1, wherein:
   a user input area includes information indicative of how the constrained edge can be moved by a user input received through a mouse input device; and
   the user input is received through the mouse input device.

7. The method of claim 1, wherein a user input selecting the constrained edge is received through gestures made in a user input area.

8. The method of claim 1, further comprising:
   removing, by one or more processors, the graphical control from the graphical user interface in response to a user confirming a value of the size of the partially obscured cell that is to be increased beyond the boundary conditions of the spreadsheet.

9. A computer program product for adjusting a property of a particularly obscured cell in a spreadsheet displayed on a graphical user interface, the computer program product comprising a non-transitory computer readable storage medium having program code embodied therewith, the program code readable and executable by a processor to perform a method comprising:
   partially obscuring a cell in a spreadsheet on a graphical user interface with a pop-up window to create a partially obscured cell;
   identifying all properties that are associated with the cell;
   receiving a selection of the partially obscured cell;
   identifying a property adjusted by a moveable edge of the partially obscured cell, wherein a property adjustment of the property adjusted is initially constrained by the graphical user interface, and wherein the property is from said all properties that are associated with the cell;
   creating and displaying an additional graphical control for the identified property, wherein the additional graphical control is created in response to a user selecting a constrained edge and requesting the additional graphical control from a context menu associated with the partially obscured cell, wherein the additional graphical control includes a control icon that increases a size of the partially obscured cell beyond a viewable area of the graphical user interface, wherein the additional graphical control is incorporated into the pop-up window, and wherein the pop-up window includes a visual representation of a button that, when activated, expands the partially obscured cell in a direction in which the partially obscured cell is to extend beyond its visibly displayed portion;
   adjusting the identified property based on a user interaction with the additional graphical control, wherein the identified property is no longer constrained by the graphical user interface; and
   displaying feedback for the identified property being adjusted with the additional graphical control, wherein the additional graphical control causes the identified property of the partially obscured cell to be adjusted, and wherein the adjusted property is displayed in a separate field from the additional graphical control on the graphical user interface.

10. The computer program product of claim 9, wherein the method further comprises:
    resetting the identified property in response to a user cancelling the additional graphical control.

11. The computer program product of claim 9, wherein the method further comprises:
    modifying other cells that surround the partially obscured cell with the identified property of the partially obscured cell.

12. The computer program product of claim 9, wherein operations shown in claim 1 are performed at a machine level of a computer that is independent of an application that generated the graphical user interface.

13. The computer program product of claim 9, wherein:
    a user input area includes information indicative of how the constrained edge can be moved by a user input received through a keyboard input device; and
    the user input is received through the keyboard input device.

14. The computer program product of claim 9, wherein:
    a user input area includes information indicative of how the constrained edge can be moved by a user input received through a mouse input device; and
    the user input is received through the mouse input device.

15. The computer program product of claim 9, wherein a user input selecting the constrained edge is received through gestures made in a user input area.

16. The computer program product of claim 9, wherein the method further comprises:
    removing the graphical control from the graphical user interface in response to a user confirming a value of the size of the partially obscured cell that is to be increased beyond the boundary conditions of the spreadsheet.

17. A method comprising:
    partially obscuring, by one or more processors, a graphical object on a graphical user interface with a pop-up window to create a partially obscured graphical object;
    receiving, by one or more processors, a selection of the partially obscured graphical object;
    identifying, by one or more processors, a property adjusted by a moveable edge of the partially obscured graphical object, wherein a property adjustment of the property adjusted is initially constrained by the graphical user interface;
    creating and displaying, by one or more processors, an additional graphical control for the identified property, wherein the additional graphical control is created in response to a user selecting a constrained edge and requesting the additional graphical control from a context menu associated with the partially obscured graphical object, wherein the additional graphical control includes a control icon that increases a size of the partially obscured graphical object beyond a viewable area of the graphical user interface, and wherein the pop-up window includes a visual representation of a control that, when activated, expands the partially obscured graphical object in a direction in which the partially obscured graphical object is to extend beyond its visibly displayed portion;
    adjusting, by one or more processors, the identified property based on a user interaction with the additional graphical control, wherein the identified property is no longer constrained by the graphical user interface; and
    displaying, by one or more processors, feedback for the identified property being adjusted with the additional graphical control, wherein the additional graphical control causes the identified property of the partially obscured graphical object to be adjusted, and wherein the adjusted property is displayed in a separate field from the additional graphical control on the graphical user interface.

18. The method of claim 17, further comprising:
resetting, by one or more processors, the identified property in response to a user cancelling the additional graphical control.

19. The method of claim 17, further comprising:
removing the graphical control from the graphical user interface in response to a user confirming a value of the size of the partially obscured graphical object that is to be increased beyond the viewable area of the graphical user interface.

20. The method of claim 17, wherein operations shown in claim 17 are performed at a machine level of a computer that is independent of an application that generated the graphical user interface.

\* \* \* \* \*